United States Patent [19]

Shen

[11] Patent Number: 5,328,962
[45] Date of Patent: Jul. 12, 1994

[54] HIGH HEAT ACRYLICS

[75] Inventor: Jyi-Sheng J. Shen, Covina, Calif.

[73] Assignee: ICI Acrylics, Inc., St. Louis, Mo.

[21] Appl. No.: 20,294

[22] Filed: Feb. 19, 1993

Related U.S. Application Data

[60] Continuation-in-part of Ser. No. 929,460, Aug. 12, 1992, which is a continuation of Ser. No. 679,742, Apr. 3, 1991, abandoned, which is a division of Ser. No. 322,615, Mar. 13, 1989, Pat. No. 5,073,615.

[51] Int. Cl.$^5$ .............................................. C08L 33/06
[52] U.S. Cl. .................................... 525/228; 525/227; 525/282; 525/308; 525/422
[58] Field of Search ................ 525/227, 228, 422, 282

[56] References Cited

U.S. PATENT DOCUMENTS 4,868,261 9/1989 Kobayashi et al. .................. 526/262
5,073,615 12/1991 Shen .................................... 526/262

*Primary Examiner*—James J. Seidleck
*Assistant Examiner*—Mary Critharis
*Attorney, Agent, or Firm*—Small Larkin & Kidde

[57] ABSTRACT

Miscible polymer blends of high heat resistant acrylate-maleimide polymers containing from 1 to 99% or more by weight of the maleimided polymer with conventional poly (methyl methacrylate) polymer, the blends having higher glass transition temperatures than poly (methyl methacrylate) but substantially the same optical and mechanical properties as poly (methyl methacrylate) and compatible blends of high heat resistant acrylate-maleimide polymers, conventional acrylic impact modifier, and, optionally, conventional poly (methyl methacrylate).

8 Claims, 7 Drawing Sheets

1μ

1μ

HIGH HEAT ACRYLICS

CROSS-REFERENCES TO RELATED APPLICATIONS AND INCORPORATION BY REFERENCE

This is a continuation-in-part application of U.S. application Ser. No. 07/929,460, filed Aug. 12, 1992, which is a continuation of U.S. application Ser. No. 07/679,742, filed Apr. 3, 1991, now abandoned, which is a divisional of U.S. application Ser. No. 07/322,615, filed Mar. 13, 1989, now U.S. Pat. No. 5,073,615 ('615). All of the disclosure of the '615 patent is incorporated by reference as if fully set forth herein.

BACKGROUND OF THE REFERENCE

1. Field Of The Invention

The present invention relates to improved high heat acrylics of the type described in the '615 patent (bulk polymerization process using multiple initiators, multiple time-temperature cycles including raising the polymerization temperature above the glass transition temperature of the final product. Specifically, the present invention is directed to miscible blends of these high heat resistant acrylate-maleimide polymers with conventional poly(methyl methacrylate) (PMMA) and compatible blends of the high heat resistant acrylatemaleimide polymers with acrylic impact modifier alone or, additionally, with conventional PMMA.

Within the term "conventional PMMA" is included not only homopolymers of methyl methacrylate, but also copolymers of methyl methacrylate together with minor amounts of copolymerizable monomers which are present to an extent below that which results in a significant reduction in optical properties in comparison with a homopolymer of methyl methacrylate. In general, when the conventional PMMA is a copolymer it should be formed from a copolymerizable mixture of methyl methacrylate with not more than 15% by weight of a comonomer based on the weight of the copolymerizable mixture and the comonomer should preferably be selected from alkyl acrylates or other alkyl methacrylates.

2. Description Of The Related Art

In general, acrylic polymers are well-known and are commercially desirable for their excellent optical properties, weatherability properties and cost for numerous end uses in various industries such as automotive, electronics, telecommunications, lighting, optics, business machines and decorative products for specific products such as lighting fixtures, automobile light lenses, dials, video discs, opthalmic lenses and other articles where durable, weatherable, clear features are desired.

In order to obtain specific, optimized physical properties of acrylic polymers, it is also well-known to polymerize different monomers to form co- or terpolymers. Copolymerization of a mixture of two or more monomers often led to polymers which had different and/or more suitable physical properties than either of the homo-polymers alone, or mechanical blends of polymers formed from the individual monomers.

The most popular commercial acrylate polymer in the acrylic industry at present is PMMA, which has relatively high clarity and excellent light transmission properties. Furthermore, PMMA has excellent resistance to sunlight, low density, durability and is pleasing in appearance. However, PMMA has a relatively low heat distortion temperature (HDT) and relatively low glass transition temperature (sometimes referred to as Tg). Conventional PMMA is satisfactory for most uses only for relatively short times at temperatures between 90° C. and 102° C., and the glass transition temperature of PMMA copolymers generally falls within the range of 85°–110° C. Thus, for many uses, especially in lighting systems, the HDT's and Tg's of conventional PMMA are unsatisfactorily low.

The '615 patent discloses process for making and high temperature, heat resistant acrylate-maleimide polymers which have transparency properties about the same as the transparency properties of conventional PMMA and are weather-resistant, but have glass transition temperatures from about 105° C. to 131° C., which temperatures are significantly higher than for conventional PMMA. However, the acrylate-maleimide polymers of the '615 patent are relatively brittle and relatively expensive compared to conventional PMMA-based polymers.

It has been found that a need exists for clear, PMMA-like polymers having Tg's between the Tg of PMMA and the Tg's of the polymers of the type disclosed in the '615 patent. Although mechanical blending of polymer is well-known, the physical properties and behavior of mechanical blends are often unpredictable. For example, a mechanical blend of two clear polymers might be opaque and thus not useful for applications in which transparency is required.

It is also known that a high softening point acrylic terpolymer known as "Diakon" NS 9300, formerly marketed by Imperial Chemical Industries, was incompatible with conventional PMMA. This polymer, being a terpolymer formed from a mixture of 85% by weight methyl methacrylate, 10% by weight N-o-chlorophenylmaleimide and 5% by weight of styrene, was prepared by a suspension polymerization process according to the general disclosure of U.S. Pat. No. 3,676,404. It was observed to be incompatible with conventional PMMA because when conventional PMMA was used to purge, that is clean out, an injection molding machine previously used in molding "Diakon" NS 9300, the purged material, that is a mixture of conventional PMMA and "Diakon" NS 9300, was milky white and hazy in appearance, whereas the individual materials were clear.

OBJECTS OF THE INVENTION

In light of the above-stated need for a clear, transparent, weatherable acrylic polymer having improved heat resistance, miscibility and impact resistance, the present invention has the following objectives:

It is an object of the present invention to provide a polymer blend stock whereby the heat resistance of PMMA may be increased without decreasing the optical properties of PMMA.

It is a further object of the present invention to provide a miscible blend of conventional PMMA with a high heat resistant acrylate-maleimide polymer.

It is a further object of the present invention to provide a high heat resistant acrylate-maleimide polymer blend having improved impact resistance without reduction in optical property values in comparison to conventional PMMA.

SUMMARY OF THE INVENTION

One aspect of the present invention is directed to mechanical blends of high heat resistant acrylatemaleimide polymers of the '615 patent with conventional PMMA to form a miscible blend having higher glass transition temperatures than conventional PMMA, but retaining essentially the same optical and mechanical/physical properties as conventional PMMA. It has been discovered blend ratios of 1%-99% or more of the acrylate-maleimide polymers and up to 99% or more of conventional PMMA provide the desired miscible blends.

Another aspect of the present invention is a mechanical blend of conventional acrylic impact modifier with the high heat resistant acrylate-maleimide polymers of the '615 patent to form compatible blends having increased impact resistance but little or no loss of optical properties in comparison to conventional PMMA. Additionally, conventional PMMA may be blended with the conventional acrylic impact modifier and the maleimided acrylates to form a compatible, increased heat resistant blend having optical properties essentially the same as those of conventional PMMA.

DESCRIPTION OF THE PREFERRED EMBODIMENTS

Figure 1:
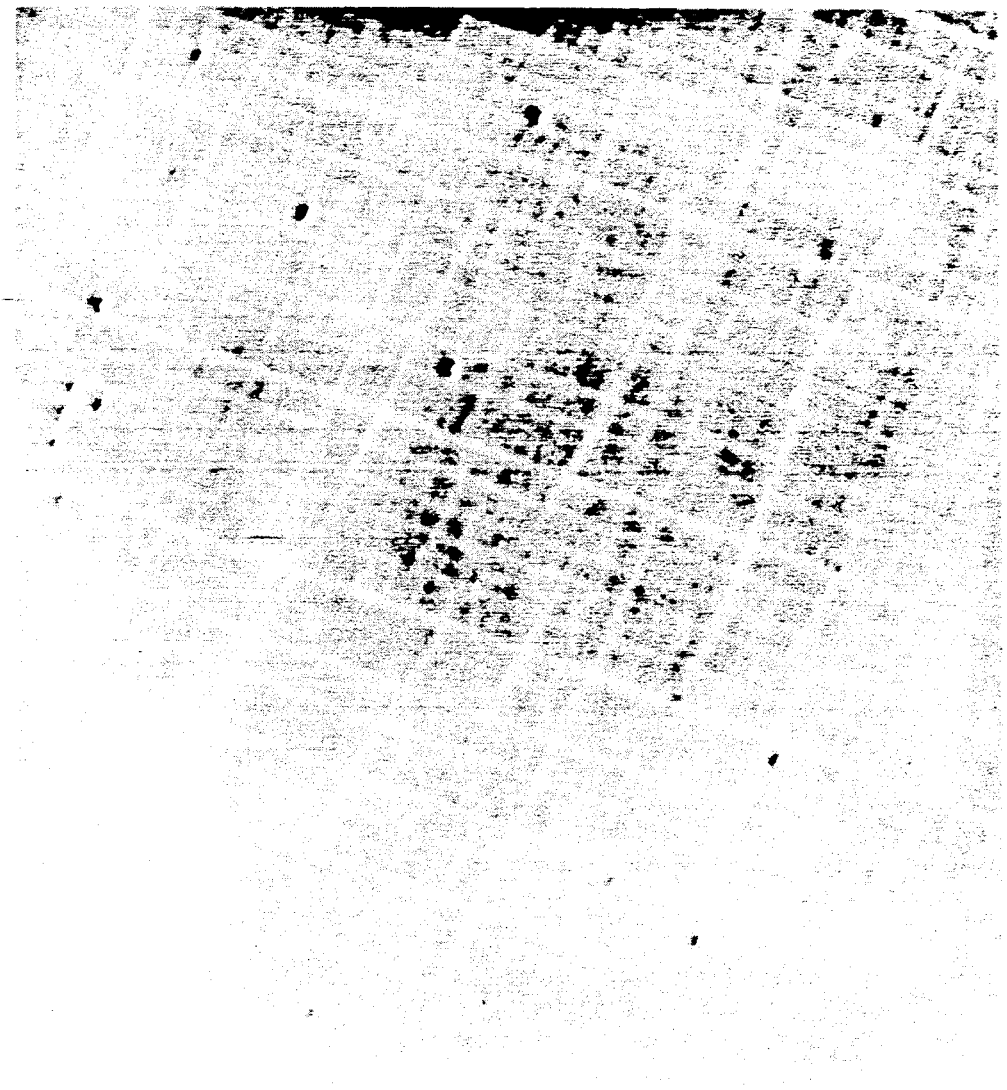
FIG. 1 is a transmission electron micrograph (TEM) of a mechanical blend of 10% to 90% by weight of conventional PMMA to high heat resistant acrylate-maleimide polymer of the present invention to a magnification of 12,480.

In the context of blends of polymers, the term "compatibility" is used to describe the phenomenon whereby a desired or beneficial result occurs when two materials, such as polymers, are mechanically combined. As referred to in D. Paul and S. Newman, *Polymer Blends*, (1978 ed.) Volume I, page 2, the term "compatibility" is often used synonymously with the term "miscibility." However, in materials technology, the term compatibility is a more general term with a greater diversity of meanings and implications. In the extreme case, two materials might be classified as "incompatible" because they are miscible. In a strict technical sense, and in the sense intended in this application, compatibility refers to whether a desired or beneficial result occurs when two materials are combined together.

The term "miscibility," as used in this application and in contrast to the term "compatibility," refers to polymer-polymer blends having behavior similar to that expected of a single-phase system. The term miscibility is used in the sense discussed in O. Olabisi, et. al., Polymer-Polymer Miscibility (1979 ed.), at pages 2-3. Thus, the term "miscibility" as used in this application does not imply ideal molecular mixing, but rather means that the level of molecular mixing is adequate to yield macroscopic properties expected of a single-phase material.

One aspect of the present application is directed to blends of conventional PMMA with the acrylate-maleimide polymers of the type described in the '615 patent. In particular, blends of conventional PMMA and the acrylatemaleimide polymers have been found to be miscible in the sense that they exhibit optical behavior similar to that of single-phase conventional PMMA even though they exhibit greater resistance to heat than conventional PMMA.

In another aspect of the present invention, the maleimided acrylate polymers of the '615 patent, when blended with conventional acrylic impact modifier and conventional PMMA also have been found to be compatible in that the toughened blends behave like a two-phase system (have two Tg's), but exhibit optical properties like that of conventional PMMA and have greater impact and heat resistance than conventional PMMA.

In yet another aspect of the present invention, it has been found that conventional impact modifier alone may be blended with conventional PMMA and the acrylatemaleimide polymers of the '615 patent to yield a compatible blend which behaves like a two-phase system, but exhibits optical properties like that of conventional PMMA and has a greater impact resistance than does conventional PMMA. Each of these improved blends will be described in greater detail below.

A. PMMA Acrylate-Maleimide Polymer Miscible Blends

As referred to above, compatible polymer blends appear to be macroscopically uniform and stable, whereas miscible polymer blends appear to be uniform and stable on a microscopic or molecular level as well. One way to test whether a particular blend is miscible is to determine, on a temperature basis, whether the blend is a two-phase system, in which case it is referred to as compatible, or whether it exhibits the properties of a single-phase system, and therefore may properly be termed miscible. One method to differentiate between a miscible blend and a compatible blend is through determination of the glass transition temperature. A blend having a single glass transition temperature may be classified as miscible. A blend with two or more glass transition temperatures and having at least one desired physical property, is for purposes of this invention, compatible. Immiscibility of polymers in each other also may reveal itself as opacity or delamination in addition to multiple glass transition temperatures or combinations of these properties.

In accordance with this aspect of the improved acrylate-maleimide polymers of the present invention, it has been found that acrylate-maleimide polymers of the type disclosed in the '615 patent may be blended with conventional PMMA to provide a miscible blend in ratios containing from 1% to approximately 90% of the acrylatemaleimide polymers and up to 99% or more of conventional PMMA. Based on determination of glass transition temperatures and determination of other optical properties, it has been discovered that completely miscible polymer blends were obtained. These miscible blends have improved heat-resistance properties in comparison to conventional PMMA, but without loss of the desirable optical or mechanical properties of conventional PMMA.

As referred to in the '615 patent, a thermoplastic, high heat resistant product known as KAMAX™, disclosed in U.S. Pat. No. 4,747,123 ('123) and made by Rohm & Hass Company, has a stated glass transition temperature of 143°-160° C. This product is competitive to the acrylate-maleimide polymers of the '615 patent. However, the '123 patent compositions are glutarimideacrylic polymers and are thus quite distinct from the compositions of the present invention. To illustrate the advantages of the present invention, however, several blends of conventional PMMA with the acrylate-maleimide polymers of the '615 patent have been compared to corresponding blends of conventional PMMA with the KAMAX ™ product.

The present invention is directed to blends of polymers made by conventional mechanical, physical or solution methods. Theoretically, the most uniform blends may be achieved through solution blending. In the various example blends described below, all were made with conventional extrusion techniques. Specifically, all of the example blends were made using one of the two conventional injection molders as follows. First, an Arburg Model 221-175-350 single screw injection molder made by Kudstoff-Spritzgiebmaschinen was used to mix some of the blends. The typical barrel temperatures for this injection molder are 193°-232° C. at the rear and 216°-260° C. at the front. The typical mold temperatures are approximately 95° C., typical injection back pressures are 10-500 psi (0.17-35 kg/cm$^2$) with 100 psi being the preferred injection molder back pressure. The preferred injection pressure is 800-1,000 psi, with a hold time of 4-6 seconds. The preferred holding pressure is 600 psi (gauge) and the preferred cooling time is 25-30 seconds.

Second, some blend examples set forth below were made using a Model 4 1/2-Pacemaker III extruder made by NRM Corp. The extrusion conditions for a six-zone extruder are 320° F. at zones 1-2, 440° F. in zone 3, 430° F. in zones 4-6 and 440° F. at the gate. The temperature setting for all dies is 435° F. The preferred screw speed is 80-100 RPM; the preferred pressure is 1210°-1360° psi (gauge) and the process is conducted under liquid nitrogen.

The conventional PMMA used in the example blends is a high molecular weight PMMA commercially available from ICI Acrylics, Inc. as CP-81. With reference to Table I below, twelve blend examples were prepared. The first five blends were of CP-81 and various weight percentages of the high heat resistant acrylate-maleimide polymer of the type disclosed in the '615 patent, and separately listed as Example 12. The second five blends set forth in Table I are blends of the CP-81 PMMA and the commercially available KAMAX ™ product, specifically designated as KAMAX T-240. Example 11 is conventional CP-81 polymer; Example 12 is the methyl methacrylate N-cyclohexylmaleimide, high heat polymer of the type disclosed in the '615 patent and having the ingredients and polymerization conditions as described below; and Example 13 is the KAMAX T-240 polymer.

TABLE I

PMMA/High Heat Resistant Polymer Blends

| Example # | % CP 81 (Conventional PMMA) | % Maleimided High Heat Polymer | % KMAX T-240 Polymer |
|---|---|---|---|
| 1 | 10 | 90 | 0 |
| 2 | 60 | 40 | 0 |
| 3 | 70 | 30 | 0 |
| 4 | 80 | 20 | 0 |
| 5 | 90 | 10 | 0 |
| 6 | 10 | 0 | 90 |
| 7 | 60 | 0 | 40 |
| 8 | 70 | 0 | 30 |
| 9 | 80 | 0 | 20 |
| 10 | 90 | 0 | 10 |
| 11 | 100 | 0 | 0 |
| 12 | 0 | 100 | 0 |
| 13 | 0 | 0 | 100 |

Upon visual inspection, the injection molded sample of the KAMAX/PMMA blend were totally opaque, and the acrylate-maleimide/PMMA blends were transparent and water clear. The refractive index of Example 11 was 1.491 and the refractive index of Example 12 was 1.493 at ambient temperature.

The optical property of transmittance of each sample was measured, in accordance with ASTM D 1003-61 (Reapproved 1988). Set forth below in Table II are the transmittance data for the various samples.

TABLE II

Transmittance T %

| Example # | T % |
|---|---|
| 1 | 90.4% |
| 2 | 92.1% |
| 3 | 91.8% |
| 4 | 91.8% |
| 5 | 92.6% |
| 6 | 29.3% |
| 7 | 21.9% |
| 8 | 23.3% |
| 9 | 31.1% |
| 10 | 41.0% |
| 11 | 92.3% |
| 12 | 91.8% |
| 13 | 88.5% |

Referring to the data of Table II above, it is readily apparent that the blends of the present invention, Examples 1-5, have transmittance percentages corresponding to that of conventional PMMA, whereas the transmittance of the Examples 6-10 KAMAX ™ blends are from less than one-quarter to less than one-half that of conventional PMMA transmittance.

The second optical property tested was that of yellowness index, in accordance with ASTM D 1925-70 (Reapproved 1988). Set forth below in Table III is the yellowness index data collected on the examples.

TABLE III

Yellowness Index (YI %)

| Example # | YI % |
|---|---|
| 1 | 1.40% |
| 2 | 1.20% |
| 3 | 1.1% |
| 4 | 0.91% |
| 5 | 0.90% |
| 6 | 47.31% |
| 7 | 20.58% |
| 8 | 17.57% |
| 9 | 13.60% |
| 10 | 11.73% |
| 11 | Less than 1.0% |

TABLE III-continued

Yellowness Index (YI %)

| Example # | YI % |
|---|---|
| 12 | Less than 1.0% |
| 13 | Less than 1.0% |

Referring to the above Table III, it is readily apparent that each of the blends of the present invention, Examples 1–5, exhibit a yellowness index very close to that of conventional PMMA whereas the yellowness index of corresponding Examples 6–10 KAMAX TM blends are approximately 14 to 16 times greater.

Visually, Examples 1–5 are essentially clear, transparent and colorless, while Examples 6–10 are clouded, non-transparent, and yellowed, hence quite unsuitable for most common uses of PMMA as a colorless, high transparency plastic.

Some of the examples were analyzed for glass transition temperature and the following data were recorded as set forth in Table IV. The Tg's were determined using a Perkin-Elmer Differential Scanning Calorimeter, Model DSC-4. The initial temperature was 50° C., the final temperature was 250° C. and the heating rate was 10° C. per minute.

TABLE IV

Glass Transition Temperature

| Example # | Mid Tg in Degrees C. |
|---|---|
| 2 | 118.7° |
| 3 | 116.8° |
| 4 | 115.8° |
| 5 | 114.1° |
| 11 | 113.6° |
| 7 | 113.6° and 144.7° |
| 12 | 132.0° |
| 13 | 145.0° |

As is readily observed from the above, the 40/60% blend of conventional PMMA/KAMAX-240, Example 7, yielded double glass transition temperatures, whereas the tested blends of the present inventions, Examples 2–5, each had a single glass transition temperature. Thus the blends of the present invention behaved as a single-phase, miscible system even though they were mechanical blends of two different polymers and in various ratios.

Some of the examples were investigated by transmission electron microscope, with the transmission electron micrographs (TEM) included as FIGS. 1–7. TEMs were obtained with a Philips CM-10 transmission electron microscope operated at about 80 kEV. The specimens were cut at room temperature with an LKB UL-TROTOME III (Type 880A) Microtome to 700 Å thickness for the measurements. The microtomes are designed to hold both the knife and the specimen rigidly, so that after each cut, when the specimen is moved past the knife edge, the specimen advanced 700 Å on each pass. The detailed procedure is set forth in J. Shen, Ph.D. dissertation entitled "Micro-Phase Separation in Copolymers from High Conversion Free Radical Polymerization, " the University of Akron, Ohio (1988) cited in the '615 patent. The polymer specimens are stored in a freezer at −30° C. for two hours and then are trimmed, initially to a squat pyramid, before cutting them into several successive sections. Staining procedures in sample preparation were not used due to the absence of unsaturated bonds in the polymer backbone of the samples.

It is believed that in order to exhibit the property of clearness in polymers three criteria must be satisfied: (1) refractive index of the two components must be matched fairly closely, i.e., within about 0.003 of each other; (2) the particle size must be small and spherical in shape; and (3) the particle size distribution must be fairly narrow, i.e., 90% of the particles should be less than 0.3µ in largest diameter.

Figure 2:
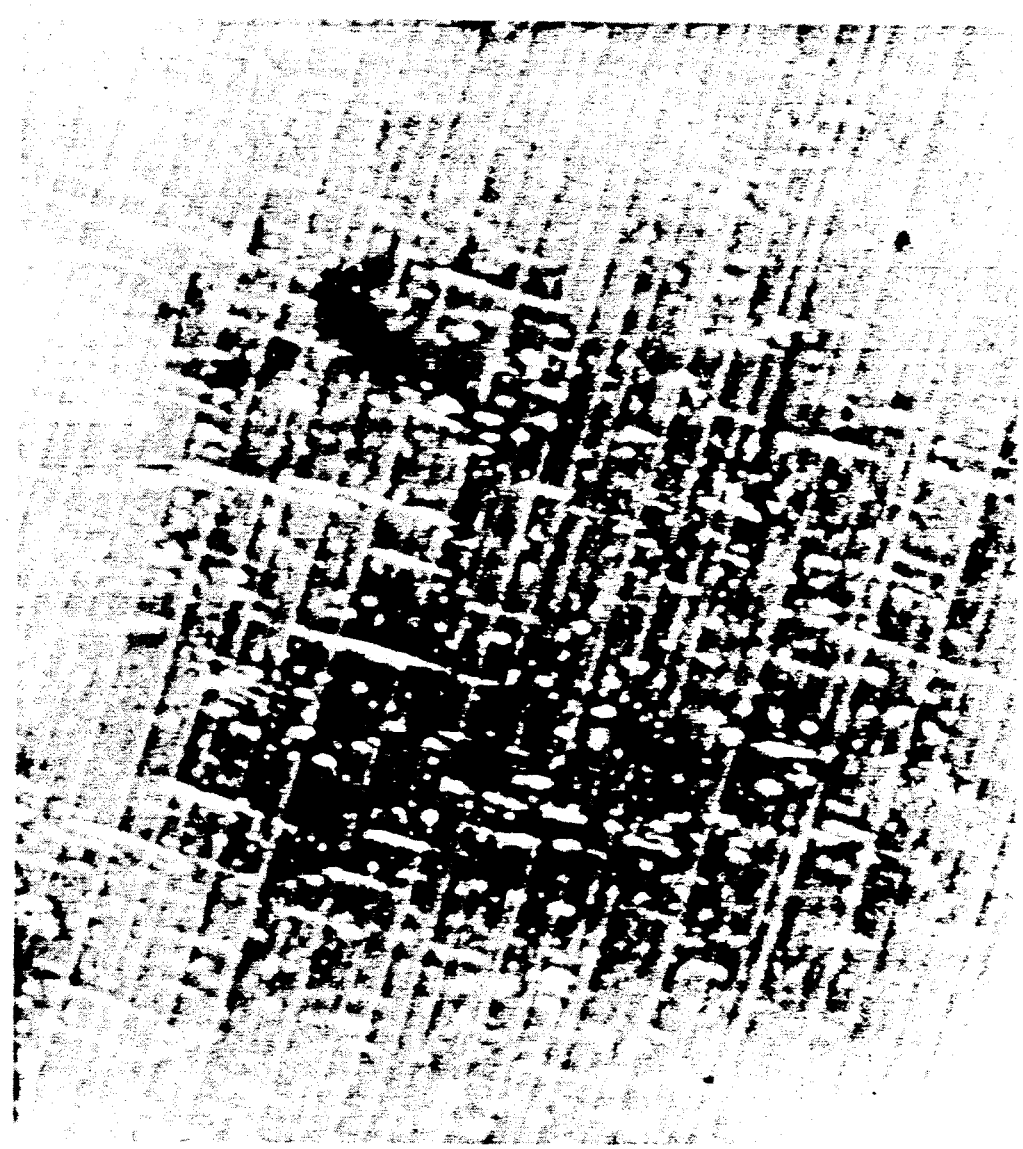
FIG. 2 is a TEM of a 10%/90% by weight blend of conventional PMMA with a conventional high heat resistant polymer at a magnification of 12,480.

Referring to FIGS. 1 and 2, TEMs of the Example 1 and Example 6 blends are shown. These example polymers are the 10%/90% blends of conventional PMMA with the Example 12 acrylate-maleimide polymer and the KAMAX TM formulation, respectively. Both micrographs were taken at a magnification of 12,480, with a 1µ reference line drawn in the lower right-hand corner of the micrograph. Referring to FIG. 1, it may be seen that the sample is relatively light and clear. Only scattered particles left as contamination in the extruder from previous use, as well as cross-hatching, believed to be reflections along stress, or cut lines in the sample, appear as disruptions to the uniform texture of the sample. With respect to the small particles, it is readily observed that they are far less than 1µ in diameter, and thus do not reduce the transparency of the sample. Referring to the FIG. 2 micrograph, it may be seen that not only are the small dirt particles and the cut lines present, but also numerous light regions (corresponding to the 10% PMMA) against a relatively dark background (90% KAMAX$^{TM}$) may be seen. The light regions vary in shape and size from small and semi-circular to relatively long relatively thin-shaped forms throughout the micrograph.

Figure 3:
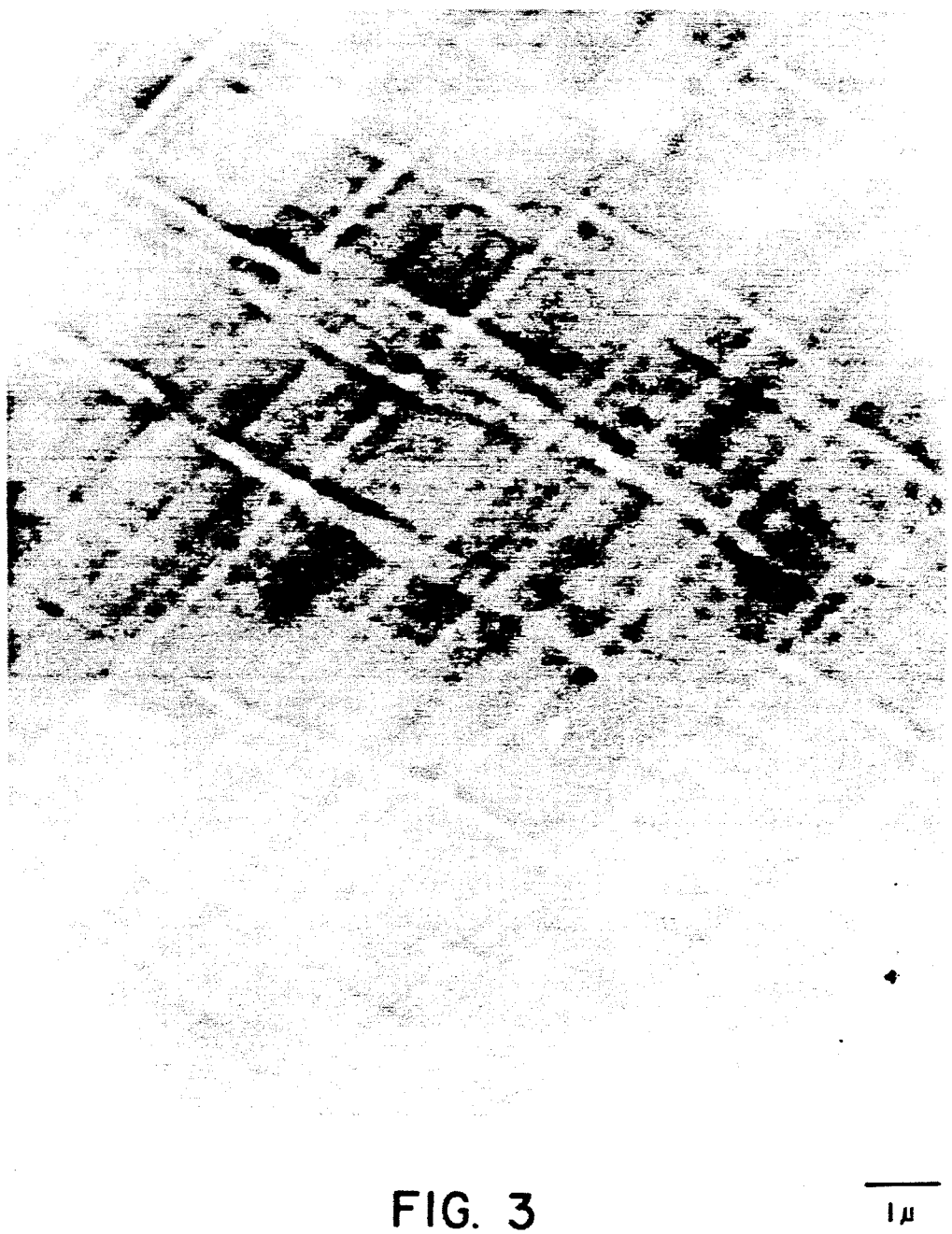
FIG. 3 is a TEM of a mechanical blend of 60% to 40% by weight of conventional PMMA to high heat resistant acrylate-maleimide of the present invention to a magnification of 12,480.
Figure 4:
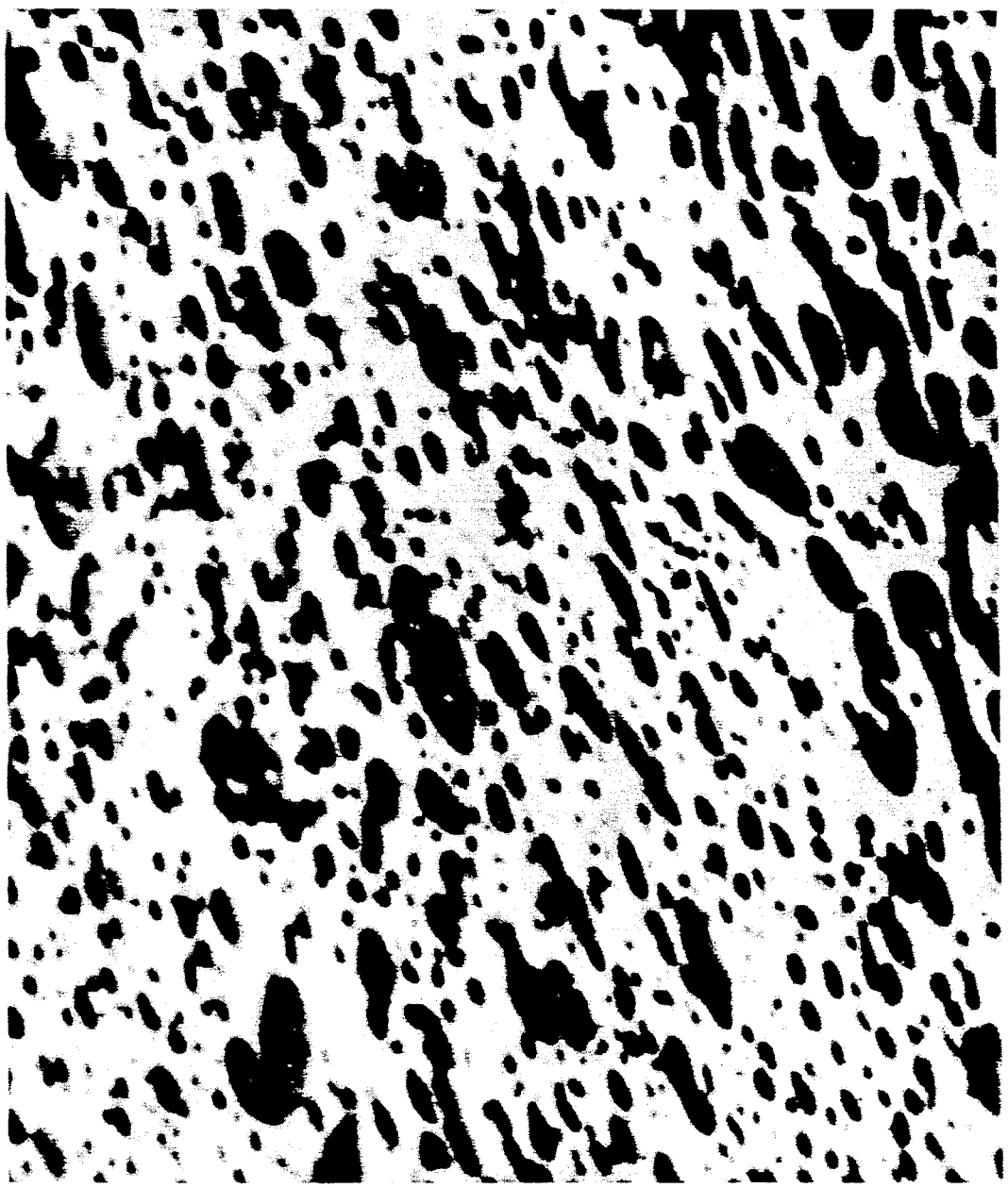
FIG. 4 is a TEM of a 60%/40% by weight blend of conventional PMMA with a conventional high heat resistant polymer at a magnification of 12,480.

Next, referring to FIGS. 3 and 4, micrographs of the 60/40 blends are compared. FIG. 3 illustrates a 60/40 blend of conventional PMMA with the Example 12 high heat acrylate-maleimide. Again, the magnification was 12,480, with a 1µ reference line shown at the lower right-hand corner. Although there are streaks, illustrating the cut lines on the sample, there are no visible dirt particles and no other particles or shapes to interfere with transparency. Referring to the FIG. 4 micrograph, also at 12,480 magnification, it is readily apparent that numerous white and dark areas are rather uniformly distributed throughout the micrograph. The dark patches, many of which are of approximately 1µ diameter or greater, illustrate or depict the presence of the KAMAX TM product and graphically show its different optical appearance in the blend.

Figure 5:
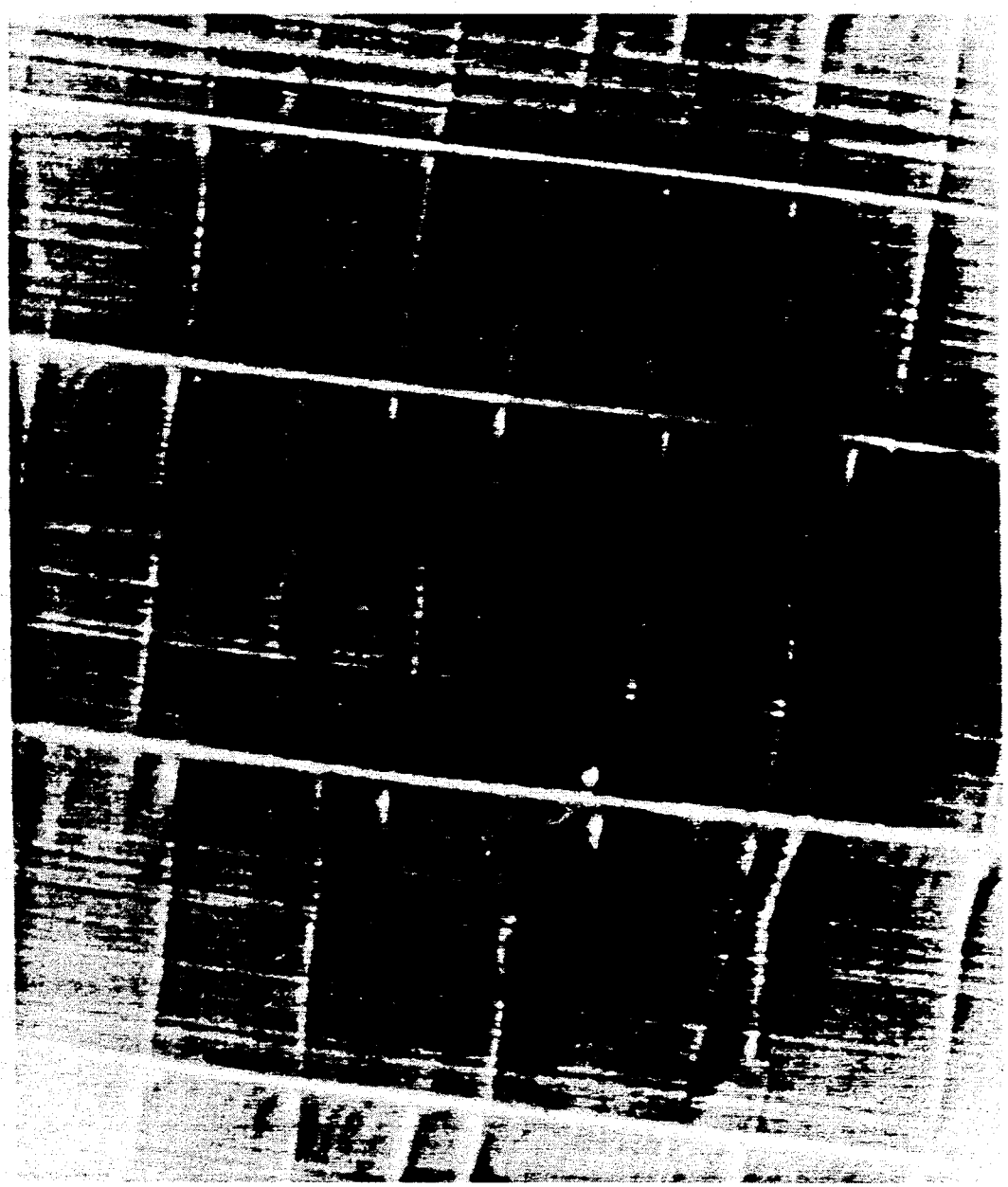
FIG. 5 is a TEM of a mechanical blend of 90% to 10% by weight of conventional PMMA to high heat resistant acrylate-maleimide polymer of the present invention to a magnification of 12,480.
Figure 6:
FIG. 6 is a TEM of a 90%/10% by weight blend of conventional PMMA with a conventional high heat resistant polymer at a magnification of 12,480.

Referring to FIGS. 5 and 6, the 90/10 blends of conventional PMMA with the Example 12 high heat resistant, acrylate-maleimide polymer and the KAMAX TM formulation, respectively, are shown. Both figures are at 12,480 magnification, with a 1µ reference line in the lower right-hand corner. Shown in FIG. 5 is the Example 5 formulation. Again, except for the light streaks, or cut lines, illustrating the cuts on the sample, the sample is uniform throughout and there are no particles large enough to diminish transparency. Thus, the transparency of the Example 5 blend is demonstrated at a microscopic level. Referring to FIG. 6, in contrast, the large, relatively dark areas on the micrograph represent the KAMAX TM product, and again, depict, microscopically, the reason why KAMAX TM blends are opaque, rather than transparent.

The above-described miscible blends are useful as acrylic "blending stock" to improve the heat resistance of PMMA without loss in optical property values. The degree of heat resistance improvement will vary in accordance with the percentage of the high heat resistant acrylatemaleimide used in a given blend.

B. Toughened High Meat Maleimided PMMA Blends

The present invention is also directed to blends of the high heat acrylate-maleimide polymers of the type described in the '615 patent with conventional acrylic impact modifiers. Conventional methyl methacrylate/acrylate/styrene acrylic impact modifier, such as described in U.S. Pat. Nos. 3,793,402; 4,217,424 and 4,254,232, when blended with the acrylate-maleimide polymers of the type described in the '615 patent, have been found to be compatible. In accordance with this aspect of the invention, various blend ratios have been found to yield blended polymers having improved impact resistance and multiple glass transition temperatures, but with optical properties substantially that of conventional PMMA.

Several impact modifiers are known. For example, impact modifier blends, known as "DR" blends, as well as other commercially available blends, have been marketed for many years.

These impact modifiers generally have a three-layer core-shell structure, as is well-known. The center of the structure is a PMMA bead, with the second, or central layer, being a cross-linked butyl-acrylate elastomer containing styrene. The third, or outermost layer, is also PMMA or copolymer. The product particles are beads generally spherical in shape and have diameters of approximately 0.2μ to 0.3μ. The three-layer impact modifier has a refractive index of 1.49.

Other impact modifiers exist as two-layered products, as is also well-known. In this type of modifier, the center particle is a cross-linked butyl acrylate elastomer surrounded by a layer of PMMA. The product particles are very fine spheres having a diameter of approximately 0.1μ to 0.2μ.

As is also well-known, the advantages of the three-layer impact modifier is that it provides higher impact resistance at the same loading value. However, the three-layer impact modifier particles are less clear in comparison to the two-layer products. The two-layer impact modifier beads have better optical properties because they are smaller. However, their disadvantage is that for the same amount of loading, they provide less impact resistance.

Set forth below in Table V is a listing of Examples 14-17, which are blends made as described above.

For the purposes of preparing the Examples 14-17 blends, conventional three-shell impact modifier and conventional two-shell impact modifier were used.

TABLE V

Toughened High Heat Acrylic Blends

| Example # | Example 12 | Two-Shell Impact Modifier % |
|---|---|---|
| 14 | 96% | 4% |
| 15 | 95% | 5% |
| 16 | 90% | 10% |
| 17 | 85% | 15% |

The Examples 15 and 16 blends had physical properties (in accordance with the ASTM procedures listed in Table XIV) as follows in Tables VI below:

TABLE VI

| Property | Example 14 | Example 16 |
|---|---|---|
| HDT | 118° C. (unannealed) | 114° C. (95° C. unannealed) |
| "Higher" Tg | 132° C. | 132° C. |
| Tensile Strength | 49.5 MPa | 50.5 MPa |
| Elongation at Break | 2.1% | 2.7% |
| Flexual Strength | 94.9 ± 5.1 MPa | 90.8 ± 9 MPa |
| Flexural Modulus | 2900 ± 208 MPa | 2610 ± 165 MPa |

The Examples 14 and 16 blends had two Tg's, but the lower Tg's of the elastomeric phase were not listed in the above Table VI because they were below room temperature.

C. PMMA Acrylate-Maleimide Polymer Impact Modified Blends

It has also been discovered that a blend of conventional PMMA with acrylate-maleimide polymer of the type disclosed in the '615 patent and impact modifier is compatible. The blends are made with conventional equipment and techniques as described above.

Conventional, impact modified PMMA is commercially available. One formulation, set forth below in Table VII as Example 18, is sold as CP-1000E. CP-1000E is a blend of CP-81 and conventional three-shell impact modifier in a ratio of 60/40. Various blends of the CP 1000E with the acrylate-maleimide polymer of Example 12 herein are also listed below in Table VII.

TABLE VII

| Example | CP-1000E % | Example 12% | CP 81% | Three-Shell Impact Modifier % |
|---|---|---|---|---|
| 18 | 100% | 0% | 60% | 40% |
| 19 | 60% | 40% | 36% | 24% |
| 20 | 70% | 30% | 42% | 28% |
| 21 | 80% | 20% | 48% | 32% |
| 22 | 90% | 10% | 52% | 36% |
| 23 | 10% | 90% | 6% | 4% |

Figure 7:
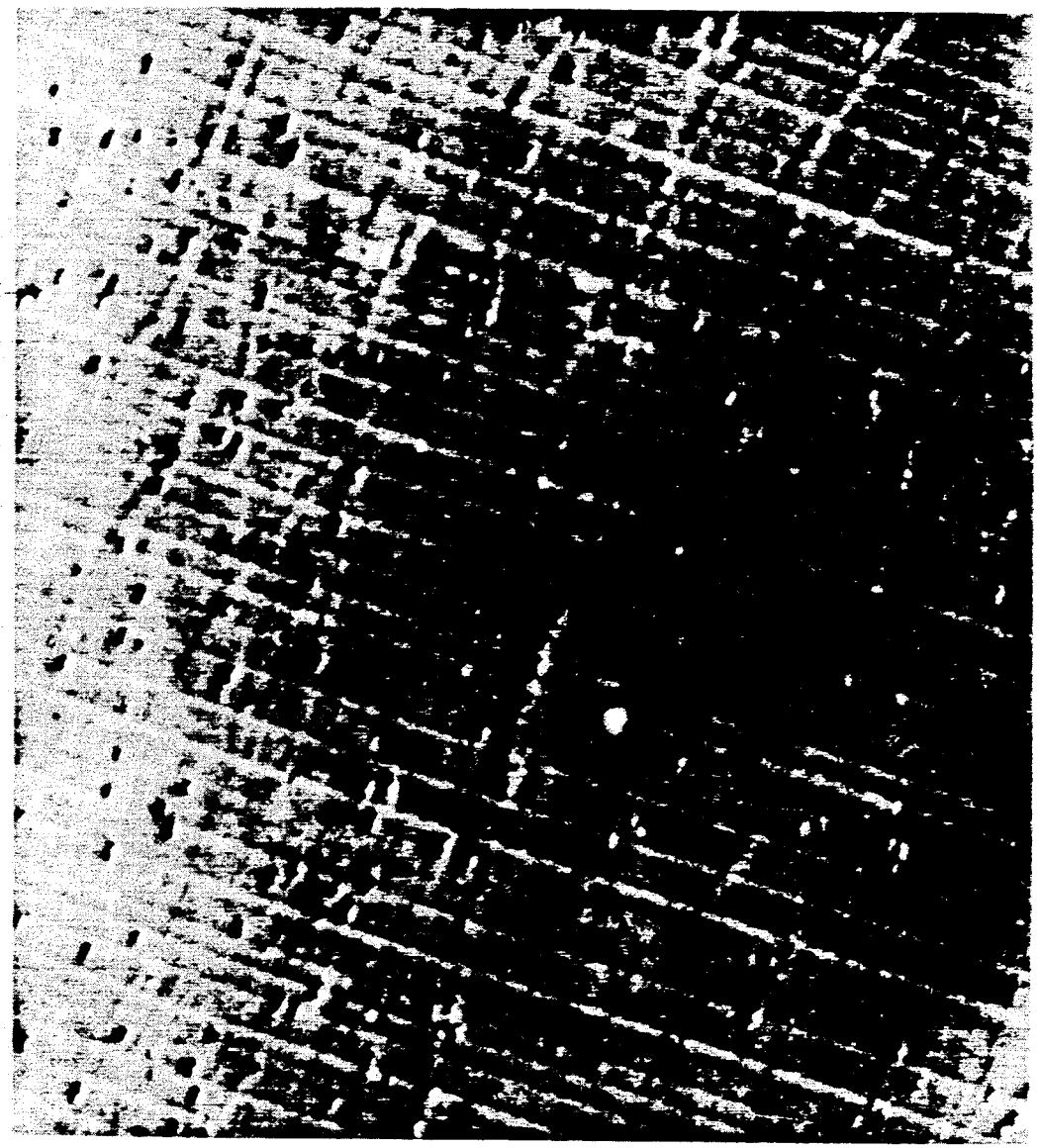
FIG. 7 is a TEM of a 10%/90% by weight blend of acrylic impact modifier, conventional PMMA and high heat resistant acrylate-maleimide polymer at a magnification of 12,480.

Referring to FIG. 7, a TEM of the Example 23 blend, at 12,480 magnification, shows the stresks at the cuts of the sample, small (less than 1μ in diameter) particles and a generally light, relatively even textured sample. The Example 23 blend is transparent upon visual inspection.

Several blends of impact modified PMMA and KAMAX ™ were also made for comparison purposes. DR 100 is a commercially available blend of conventional PMMA and DR acrylic modifier (58% PMMA and 42% DR, listed as Example 24). Those examples are set forth below in Table VIII.

TABLE VIII

| Example | DR 100% | KAMAX ™ % | PMMA | DR |
|---|---|---|---|---|
| 24 | 100% | 0% | 58% | 42% |
| 25 | 60% | 40% | 34.8% | 25.2% |
| 26 | 90% | 10% | 52.2% | 37.8% |
| 27 | 10% | 90% | 5.8% | 4.2% |

Various properties of the Examples 20-27 blends were measured in accordance with ASTM procedures identified above, and the results are set forth below in Table IX.

TABLE IX

| Example | Impact Strength (in-lb) | Transm. % | Yellowness % |
|---|---|---|---|
| 18 | 62.9 | 89.5% | 1.14% |
| 19 | 19.8 | 85.7% | 0.51% |
| 20 | 28.0 | 86.3% | 0.62% |
| 21 | 40.9 | 87.5% | 0.43% |
| 22 | 48.0 | 88.8% | 0.75% |
| 23 |  | 88.0% | 1.28% |
| 24 | 47.5 | 89.5% | .78% |
| 25 | 38.7 | 21.2% | 15.68% |
| 26 | 38.5 | 32.5% | 11.52% |
| 27 |  | 16.6% | 21.75% |

The Example 12 high heat acrylate-maleimide polymer listed above was made in accordance with the procedure set forth in the '615 patent, but with a third initiator and a six-stage polymerization cycle. Set forth below in Table X is a listing of the ingredients for the Example 12 formulation:

TABLE X

| Ingredient | Example 12 Amount |
|---|---|
| Methyl Methacrylate (MMA) | 1700 lbs. |
| Cyclohexyl Maleimide (CHMI) | 300 lbs. (15%) |
| Lauryl Peroxide | .80 lbs (400 ppm) |
| 2,5-Dimethyl-2,5-Di (T-Butyl Peroxy) Hexane | .20 lbs (100 ppm) |
| N-Dodecyl Mercaptan | 7.0 lbs (0.35%) |
| Dioctyl Sodium Sulfosuccinate | .32 lbs. (160 ppm) |
| Tinuvin P | 0.20 lbs. (100 ppm) |
| Di-thio-bis-stearyl Propionate | 2.0 lbs. (0.1%) |
| Stearyl Alcohol | 10.0 lbs. (0.5%) |
| Tinuvin 440 | 0.4 lbs. (200 ppm) |
| 2,5-Dimethyl-2,5-Di-(tert-butyl peroxy) Hexyne-3 (Trigonox 145) | 0.08 lbs. (40 ppm) |
| Anthraquinone | 1.0886 gram (1.25 ppm) |

The above ingredients were mixed and reacted in accordance with disclosure set forth in the '615 patent, but an additional time-temperature step was employed in the polymerization process. Set forth below in Table XI is the polymerization temperature-time steps used to make the Example 12 high heat resistant polymer.

TABLE XI

| Step or Stage | Temp. Range | Time Elapsed |
|---|---|---|
| One | 61° C. | 12 hours |
| Two | 58° C. | 2 hours |
| Three | 75° C. | 2 hours |
| Four | 90° C. | 3 hours |
| Five | 115° C. | 2 hours |
| Six | 160° F. | 4 hours |

The residual maleimide content of the Example 12 polymer is 0.22% and the residual MMA is less than 0.2%.

It is noted that, and as also disclosed in the '615 patent, heat is removed from the polymerizing mixture during the early stages and is added during the latter stages. In the latter stages, preferably the latest stage, sufficient heat is added to the polymerizing mixture to raise the temperature, by about 10° C. at least, above the Tg of the finished polymer. The acrylate-maleimide polymers thus formed are injection moldable, thermoplastic polymers.

It is also noted that although MMA and N-cyclohexylmaleimide were used in Example 12 as ingredients, the miscible and compatible formulations are believed to also be achievable with the other ingredient monomers as listed in the '615 patent, and the present invention is directed to all such formulations and methods as well.

The above-described preferred embodiments and examples are provided by way of illustration only and are not intended to limit the invention to only those examples as specifically set forth above. Rather, it is anticipated that numerous alternative formulations of methacrylate/acrylate/maleimide compositions and blends may be formulated within the principles of the present invention, which is defined according to the claims appended hereto.

I claim:

1. A polymer blend comprising about 1 to 99% by weight of an acrylate-maleimide polymer and up to 99% by weight of poly (methyl methacrylate) polymer, whereby
    the blend has optical properties substantially equal to the optical properties of conventional poly (methyl methacrylate); and
    is miscible.

2. The polymer blend of claim 1 wherein the acrylate-maleimide polymer comprises a copolymer of N-cyclohexyl maleimide and methyl methacrylate.

3. The polymer blend of claim 2 wherein the N-cyclohexylmaleimide is up to 30% by weight of the acrylatemaleimide polymer.

4. The polymer blend of claim 1 wherein the blend has an optical transmittance of at least 90% as measured in accordance with ASTM D 1003-61 (Reapproved 1988).

5. A polymer blend comprising about 1% to 90% by weight of an acrylate-maleimide polymer, up to about 99% of methyl methacrylate/acrylate/styrene acrylic impact modifier and up to 99% by weight of poly (methyl methacrylate) polymer, whereby
    the blend has higher impact resistance than the impact resistance of conventional poly (methyl methacrylate); and
    is compatible.

6. The polymer blend of claim 5 wherein the acrylate-maleimide polymer comprises a copolymer of N-cyclohexylmaleimide and methyl methacrylate.

7. The polymer blend of claim 6 wherein the N-cyclohexylmaleimide is up to 30% by weight of the acrylatemaleimide polymer.

8. The polymer blend of claim 5 wherein the blend has an optical transmittance of at least 85% as measured in accordance with ASTM D 1003-61 (Reapproved 1988).

* * * * *